April 1, 1958 G. A. MAHOFF ET AL 2,828,986
PACKING SLEEVE FOR A TUBE COUPLING
Original Filed June 18, 1949
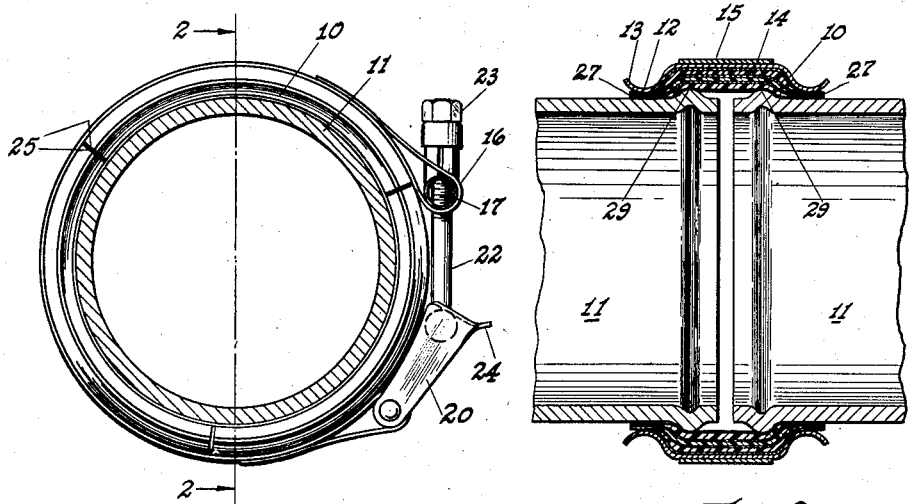
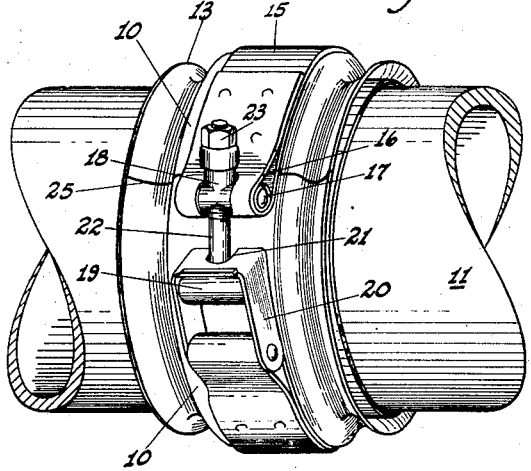
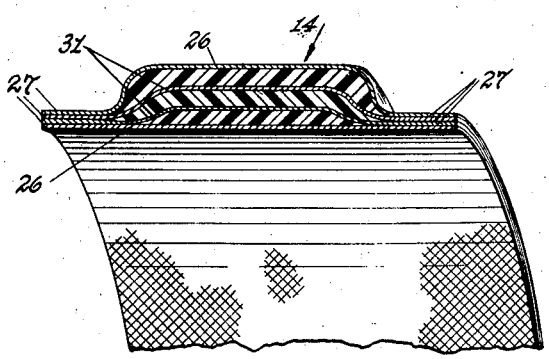
INVENTOR.
Lyle N. West
BY George A. Mahoff
George V. Smyth
ATTORNEY United States Patent Office 2,828,986
Patented Apr. 1, 1958

2,828,986

PACKING SLEEVE FOR A TUBE COUPLING

George A. Mahoff and Lyle A. West, Los Angeles, Calif., assignors, by mesne assignments, to Aeroquip Corporation, Jackson, Mich., a corporation of Michigan Continuation of application Serial No. 100,054, June 18, 1949. This application May 31, 1955, Serial No. 511,853

2 Claims. (Cl. 288—2)

This is a continuation application of application Serial Number 100,054, filed June 18, 1949, for Coupling Devices.

This invention relates to coupling devices, and more particularly to a device for connecting together the abutting ends of conduits or pipes carrying high temperature fluids under pressure.

The general object of the invention is to provide a tube coupling device adapted to maintain a good fluid tight joint in a fluid line carrying fluids at high pressures and temperatures, without deterioration under the combined effect of temperature and pressure.

A particular object of the invention is to provide improvements in a type of fluid line joint wherein a plurality of relatively rigid segments of inwardly opening channel section are circumscribed and retained by a band of flexible material which functions to draw them radially inwardly about an annular packing sleeve and to seal the respective ends of such packing sleeve against adjoining ends of tube sections of a fluid line.

In particular, the invention aims to provide an improved flexible packing sleeve of heat resistant resilient material having a high thermo-stability at elevated temperatures, for use in a coupling of the type outlined above and which is particularly resistant to deterioration under the combined effect of fluid pressure and high temperature.

One of the major problems in a fluid line joint wherein a packing sleeve of resilient material such as rubber is clamped around the ends of adjoining tube sections is the tendency of the sleeve to extrude outwardly from the ends of the metal coupling sheath under the effect of the restricted pressure applied by the sheath. This condition is greatly aggravated under the deteriorating effect of high temperature. One of the special objects of this invention is to provide an improved packing sleeve which is so constructed as to resist such extrusion and to remain dimensionally stable within a range of yieldability sufficient to adapt the same to tight sealing around the tube sections in response to the pressure of the coupling sheath.

The coupling device herein shown is intended to be used with tubes having beads formed adjacent the ends to be connected by the coupling device. The beads, besides their usual reinforcing function, cooperate with the coupling device to hold the tubes against separation. As the inner diameter of the flanges is less than the outer diameter of the beads, the wedging of the material of the casing and its resilient filler between the flanges and the beads after the band has been tightened about the segments prevents the ends of the tubes from separating a distance sufficient to destroy the connection.

Toward the attainment of the foregoing objects, the invention contemplates, in its preferred embodiment, a packing sleeve having a casing of woven glass cloth and a resilient filling of silicone rubber or elastomer which, though it tends to soften at elevated temperatures, has a remarkable thermal stability and is not adversely affected by high temperature in a manner to decompose or break down as with natural rubber.

The coupling device of the present invention is well adapted to be used in any system where either the fluid carried by the tubes is at an elevated temperature or where the temperature of the ambient atmosphere is relatively high. As the casing containing the resilient material is heat resistant, it cooperates or coacts with the flanges of the coupling to maintain the resilient material confined even though the relatively high temperatures may tend to soften the same.

The filled casing has a cross sectional shape substantially that of the channel formed by the flanged shoes or segments and thus completely fills the channel when disposed therein. As the band is tightened to radially draw the segments about the ends of the tubes to be joined, the beads on the latter are forced into the filled casing and the same in turn, as the walls thereof are relatively flexible, tends to deform downwardly about the beads. Thus, as the silicone elastomer filling the casing will be compressed and wedged between the beads and the flanges of the shoes as the band is tightened, any outward movement of the tubes will be resisted by the silicone elastomer confined by the casing.

As the silicone elastomer is confined by the relatively strong walls of the casing, any softening of the elastomer by high temperatures does not affect the coupling and seal effected by the coaction between the elastomer and the flanged shoes or segments held by the band about the ends of the tubes.

Other objects will become apparent in the ensuing specifications and appended drawing in which:

Fig. 1 is a side view of the coupling device mounted in place on the tubes with the tubes being shown in section;

Fig. 2 is a section taken along line 2—2 of Fig. 1;

Fig. 3 is a perspective view of the coupling of the present invention shown mounted to a pair of tubes with a portion of the coupling device removed for more closely illustrating the same; and Fig. 4 is a fragmentary perspective view, partly in section, on an enlarged scale of the casing of the coupling of the present invention.

The coupling of the present invention, referring now to the drawing, comprises a plurality of metallic segments or shoes 10 adapted to be placed around the substantially abutting ends of the tubes 11 to be joined. Each segment or shoe is formed at opposite ends thereof with inwardly and laterally extending flanges 12 coextensive therewith. The flanges preferably are formed at the free edges thereof with reversely curved ribs 13 to reinforce the flanges. The segments or shoes 10, together with the flanges 12, when placed as shown in Figs. 2 and 3, form an annular groove for receiving and confining an annular casing 14, the opposite edges of which are disposed between the tubes 11 and the ribs 13 carried by the flanges 12 at opposite sides of the segments or shoes 10.

The segments or shoes 10 are held about the casing 14 by a clamping band 15 of some relatively flexible metal such as stainless steel. Each end of the band is bent back on itself and spot-welded to form a loop 16. The one loop receives oppositely directed cylindrical ears 17 of a trunnion member 18 having body member extending substantially normal to the ears 17. The loop formed at the opposite end of the band receives a cylindrical bearing member 19, to the opposite faces of which are pivotally attached the free ends of a U-shaped arm 20. The bow of the arm 20 is cut away or notched, as shown at 21, to receive the shank of a T-bolt 22 to permit the head thereof to nest between the fingers of the U-shaped arm 20. The threaded end of the T-bolt 22 is passed through the opening formed in the loop in which the trunnion 18 is mounted and the smooth or unthreaded bore of the body member of the trunnion 18. The end of the bolt projecting beyond the trunnion takes a nut 23 which when threaded onto the bolt draws the looped ends of the band together to radially draw the shoes 10 inwardly about the casing 14. As the bow of the arm is notched it is not necessary to separate the bolt and nut when it is desired to remove the coupling for the opposite ends of the band can be disconnected merely by loosening the nut sufficiently to permit the arm to be swung away from the T-bolt. The bow of the arm 20 is preferably formed with a small finger 24 to facilitate swinging movement of the arm about its pivotal connection to the bearing member 19.

Although the segments 10 need not be connected to the band 15, in the preferred form of the device herein shown each segment is rigidly fixed to the band, as by spot-welding. This facilitates use of the device and eliminates the necessity of holding the segments or shoes 10 about the packing sleeve as the band 15 is mounted in place. The welds joining the segments 10 to the band 15, however, should be so spaced that the opposite ends of the band 15 may be drawn apart to separate the segments 10 to permit the same to be placed about the packing sleeve 14 after it has been mounted to the adjacent ends of the tubes to be joined. The band, as it is formed of a relatively flexible metal, acts as a spring loaded hinge in this operation, for it normally tends to hold the segments or shoes together.

The flexibility of the metal of the band 15 eliminates the danger of deforming the coupling device as it is spread apart before it is mounted about the packing sleeve 14 and also allows the band to be tightly clamped about the segments or shoes as the nut 23 is tightened on the bolt 22.

The coupling device of the present invention is not intended to be used as an adjustable or universal device, for each coupling device will be used only with tubes of a diameter with which the device was designed to be used. The segments 10 therefore will be of such a size that the end faces 25 thereof will be brought into close proximity if not in contact when the band is tightened to clamp the segments about the packing sleeve. If desired, the adjacent ends of the segments or shoes may overlap slightly, in which event the overlapping ends will reinforce each other and thus render the coupling device stronger in use.

The packing sleeve 14, referring now to Fig. 4, comprises inner and outer sheets 26 of a heat resistant material, such as woven glass cloth. The sheets 26 are cut on the bias, that is, the individual strands of the glass fibers extend angularly to the longitudinal axis. This, as will be understood, permits the cover sheets to give or stretch both transversely as well as longitudinally. The width of the outer cover sheet is substantially greater than the width of the inner cover sheet, so that the sheets, when superimposed and the end portions 27 bonded together, define an enclosure which, in the embodiment of the present invention, is preferably filled with a synthetic resilient material having a relatively high thermal stability such as one of the silicone elastomers or rubbers. It will be noted that the ends 27 of the woven sheet material are united face to face to form what may be termed marginal gasket portions along each of the two ends of the sleeve 14.

Silicone elastomers or rubbers, silicone polymers having rubber-like resilient characteristics, have a remarkable thermal stability, as they do not deteriorate or decompose at temperatures well above temperatures at which natural rubbers break down. The thermal stability of these elastomers is inherent in the silicone polymer and is not a property acquired by special compounding. Silicone rubbers are procurable on the open market and those produced and sold by the Dow-Corning Corporation of Midland, Michigan, under the trade name "Silastic" have been used as the material filling the casing. Specifically, "Silastics" designed by Dow-Corning Corporation as Nos. 125 and 7003 have been found to give excellent service results in use. These synthetics furthermore have a relatively high resistance to permanent compression set and are remarkably resistant to chemicals, oils and other compounds which adversely affect rubber.

Although silicone elastomers may soften or become more plastic under relatively high temperatures, these synthetic materials nevertheless retain their resilient properties at temperatures in excess of 500° F. Even though the coupling device may in use be subject to temperatures in excess of that temperature at which the elastomer used may tend to soften, the cover sheets 26 forming the casing of sleeve 14 will restrain the same and prevent its extrusion inwardly between the tubes as well as outwardly between the flanges 12 and the outer surfaces of the tubes circumscribed by the coupling.

As the packing sleeve has a cross sectional shape substantially that of the channel formed by the flanged segments 10, the former is compressed as the segments are drawn inwardly by the contraction of the clamping band 15. The beads 29 formed adjacent the ends of the conduits 11 to be joined end-to-end, are forced into the sleeve as the same is circumferentially compressed. As the cover sheets 26 are cut on the bias, the same will give or stretch to permit the protrusion of the beads into the sleeve. Thus, as the sleeve is compressed and wedged between the beads 29 and the flanges 12, any outward movement of the conduits will be resisted by the packing sleeve confined by the segments 10 and the flanges 12 thereof.

It should be realized that the inner margins of the flanges after the band is tightened must be spaced from the conduits a distance less than the height of the beads to effect not only the seal but the coupling desired. In the preferred use of the coupling of the present invention the ribs 13 of the flanges 12 are preferably brought into engagement with the marginal gasket portions formed by the bonded ends 27 of the layers forming the envelope 14. As the ends 27 are thus compressed between the ribs or feet 13 of the flanges and the tubes, all danger of the bond between the end portions of the cover sheets 26 failing in use is obviated, and the envelope proper is completely relieved of the burden of resisting the pressure inside the pipe. There is no tendency of the envelope to burst under pressure since the outer surface of the envelope is completely encased by metal. The feet 13 are smoothly curved and there is no likelihood of the same cutting or marring the bonded edge portions engaged.

Even though the silicone elastomers may soften because of prolonged exposure to high temperatures, the walls of the glass cloth casing, as they are not affected by high temperatures, will cooperate with the segments and the flanges thereof to confine the silicone elastomer and prevent its flow. Thus the silicone elastomer producing the seal, even though it may soften somewhat at relatively high temperatures, nevertheless is restrained and held within the channel formed by the segments 10 and the flanges 12 thereof.

To strengthen the packing sleeve and to more efficiently restrain the silicone elastomer filling the latter, intermediate layers 31 of woven glass fibers may be used, as clearly shown in Fig. 4. The opposite end portions of the intermediate layers 31 are bonded between the end portions of the layers 27 and the various bonded layers making up the opposite end portions 27 of the sleeve are held against separation by the flanges 12, for as above explained, the feet 13 of these flanges are brought into compressive engagement with the opposite edges of the sleeve when the band 15 is tightened.

In the now preferred method of forming the sleeve 14, bands of woven glass fibers cut on the bias and of the width necessary are coated with the silicone and then superimposed, after which the opposite end portions are bonded together in a suitable mold to form an elongate flat composite ribbon having a cross sectional shape such as is shown in Fig. 4. This ribbon is then cut into individual lengths and the opposite ends of the latter are brought into engagement to form a sleeve. The opposite ends of the length of ribbon are not integrally joined to form the annular member. The silicone is preferably cured at the time the edges of the layers 26 are bonded together, at which time the envelope is molded to the desired cross-sectional shape.

From the foregoing it will be apparent that the invention provides a packing sleeve wherein the respective cover sheets 26 function to confine the core of silicone elastomer material which provides the relatively thick central body portion of the packing sleeve, and, by the extension of the end portions 27 of the cover sheets 26 beyond the respective ends of the core, with the substantially direct bonding of these end portions to one another, provides relatively thin cuff portions which are clamped between the feet 13 of flanges 12 and the walls of tube sections 11, 11 immediately outwardly of beads 29, 29. The cuff portions, having substantially none of the soft yieldable silicone elastomer filling material between them, are relatively stiff and non-stretchable. Accordingly, they are resistant to being extruded axially outwardly between the feet 13 and the tube sections 11 when tightly clamped against the tube section by the feet 13. At the same time, being thus tightly clamped, the cuff portions effectively function as stoppers or gaskets to plug the annular spaces between the ends of the coupling sheath and the tube sections, to prevent outward extrusion of the softer end portions of the relatively thick central body of the sleeve, as said end portions are clamped radially against the beads 29. Thus there is provided a joint which is dimensionally stable under adverse conditions of high temperature and pressure as well as mechanical loads imposed on the packing sleeve through the tube sections; to a much greater extent than is true of a plain packing sleeve of a single soft material.

We claim:

1. A packing sleeve comprising: a relatively thick, yieldable central tubular body portion adapted to bridge between beads of respective tube sections and to be received in a containing metal sheath of channel section, and relatively thin cuff-portions at the respective ends of the sleeve, of smaller diameter than the internal diameter of said body portion, for engagement between the end portions of said sheath and the walls of said tube sections immediately outwardly of said beads; said sleeve being of composite structure including a compressible core of silicone elastomer material and a casing of fiber glass cloth enclosing and vulcanized to said core, said casing comprising inner and outer cover sheets having respective end portions projecting beyond said core, converging into proximity to one another, and bonded together and directly connected to one another to provide said cuff portions, said cuff portions being relatively stiff and non-compressible, so as to resist axial extrusion when subjected to radial compression between said flanges and said tube section walls.

2. A packing sleeve comprising: a relatively thick, yieldable central tubular body portion adapted to bridge between beads of respective tube sections and to be received in a containing metal sheath of channel section, and relatively thin cuff-portions at the respective ends of the sleeve, of smaller diameter than the internal diameter of said body portion, for engagement between the end portions of said sheath and the walls of said tube sections immediately outwardly of said beads; said sleeve being of composite structure including a compressible core of silicone elastomer material and a casing of fiber glass cloth enclosing and vulcanized to said core, said casing comprising inner and outer cover sheets having respective end portions projecting beyond said core, converging into proximity to one another, and bonded together to provide said cuff portions, an intermediate reinforcing sleeve of fiber glass cloth laminated between sections of said silicone elastomer body and separating said sections into respective tubular bodies one encircling the other, said intermediate sleeve having end portions interposed between the end portions of said casing and bonded thereto by extremely thin films of said silicone elastomer material, said cuff portions being relatively stiff and non-compressible, so as to resist axial extrusion when subjected to radial compression between said flanges and said tube section walls.

References Cited in the file of this patent
UNITED STATES PATENTS

| | | |
|---|---|---|
| 232,122 | Hammesfahr | Sept. 14, 1880 |
| 1,497,549 | Conradi | June 10, 1924 |
| 1,662,603 | Ferguson | Mar. 13, 1928 |
| 2,008,682 | Christenson | July 23, 1935 |
| 2,038,629 | Bates | Apr. 28, 1936 |
| 2,173,744 | Payne | Sept. 19, 1839 |
| 2,354,538 | Parker | July 25, 1944 |
| 2,395,745 | King | Feb. 26, 1946 |
| 2,426,423 | Woolsey | Aug. 26, 1947 |
| 2,460,984 | Hill | Feb. 8, 1949 |
| 2,474,431 | Lipman | June 28, 1949 |
| 2,562,262 | De Witt | July 31, 1951 |
| 2,686,747 | Wurtz et al. | Aug. 17, 1954 |

FOREIGN PATENTS

| | | |
|---|---|---|
| 1,800 | Great Britain | 1885 |
| 310,126 | Italy | July 28, 1933 |
| 543,529 | Great Britain | Mar. 2, 1942 |

OTHER REFERENCES

Product Eng., February 1947, pages 146–150, article entitled "Silicone Rubber Properties and Applications."